US008836725B2

(12) United States Patent
Chatting et al.

(10) Patent No.: US 8,836,725 B2
(45) Date of Patent: Sep. 16, 2014

(54) PROVIDING AN IMAGE FOR DISPLAY

(75) Inventors: David J Chatting, Ipswich (GB);
Victoria L Milner, Stockport (GB);
Jeremy M Thorne, Ipswich (GB)

(73) Assignee: British Telecommunications public limited company, London (GB)

(*) Notice: Subject to any disclaimer, the term of this patent is extended or adjusted under 35 U.S.C. 154(b) by 1009 days.

(21) Appl. No.: 12/377,718

(22) PCT Filed: Aug. 28, 2007

(86) PCT No.: PCT/GB2007/003244
§ 371 (c)(1),
(2), (4) Date: Feb. 17, 2009

(87) PCT Pub. No.: WO2008/025969
PCT Pub. Date: Mar. 6, 2008

(65) Prior Publication Data
US 2010/0231609 A1   Sep. 16, 2010

(30) Foreign Application Priority Data
Aug. 30, 2006   (EP) .................................... 06254504

(51) Int. Cl.
G09G 5/377   (2006.01)
G06T 3/00   (2006.01)
(52) U.S. Cl.
CPC ........ G06T 3/0012 (2013.01); G09G 2340/045 (2013.01)
USPC ...................................................... 345/660
(58) Field of Classification Search
CPC ............................................. G09G 2340/045
USPC ........................................................ 345/660
See application file for complete search history.

(56) References Cited

U.S. PATENT DOCUMENTS

| 5,384,904 | A  | * | 1/1995  | Sprague et al. ............... 345/668 |
| 6,388,684 | B1 | * | 5/2002  | Iwamura et al. .............. 715/788 |
| 6,396,507 | B1 | * | 5/2002  | Kaizuka et al. ............... 345/661 |
| 6,970,599 | B2 | * | 11/2005 | Longe et al. .................. 382/185 |
| 7,260,261 | B2 | * | 8/2007  | Xie et al. ...................... 382/173 |
| 7,471,827 | B2 | * | 12/2008 | Xie et al. ...................... 382/173 |
| 7,620,264 | B2 | * | 11/2009 | Chatting et al. .............. 382/276 |
| 7,646,395 | B2 | * | 1/2010  | Chatting et al. .............. 345/646 |

(Continued)

FOREIGN PATENT DOCUMENTS

EP   1 420 362        5/2004
EP   1420362 B1  *   1/2007

OTHER PUBLICATIONS

Fred Stentiford, "Attention Based Facial Symmetry Detection" S. Singh et al. (Eds.): ICAPR 2005, LNCS 3687, pp. 112-119, 2005.*

(Continued)

Primary Examiner — Javid A Amini
(74) Attorney, Agent, or Firm — Nixon & Vanderhye P.C.

(57) ABSTRACT

A method of providing an image for display comprises: determining a target image size in terms of first and second dimensions; processing an input image to detect a region of interest therein, the region of interest having first and second dimensions; and providing an image for display by modifying the input image having regard to the first and second dimensions of the target image size and the first and second dimensions of the region of interest in the input image. Also disclosed is corresponding apparatus and a corresponding computer program.

12 Claims, 4 Drawing Sheets

(56) References Cited

U.S. PATENT DOCUMENTS

| | | | |
|---|---|---|---|
| 7,787,678 B2* | 8/2010 | Unal et al. | 382/128 |
| 7,982,762 B2* | 7/2011 | Chatting et al. | 348/14.07 |
| 2002/0076116 A1* | 6/2002 | Eschbach | 382/260 |
| 2002/0106114 A1* | 8/2002 | Yan et al. | 382/118 |
| 2002/0113862 A1* | 8/2002 | Center et al. | 348/14.08 |
| 2002/0150280 A1* | 10/2002 | Li | 382/117 |
| 2005/0084136 A1* | 4/2005 | Xie et al. | 382/107 |
| 2005/0152613 A1* | 7/2005 | Okutsu et al. | 382/254 |
| 2005/0190202 A1* | 9/2005 | Suzuki et al. | 345/660 |
| 2006/0058624 A1* | 3/2006 | Kimura | 600/407 |
| 2006/0240873 A1* | 10/2006 | You et al. | 455/566 |
| 2007/0003160 A1* | 1/2007 | Chatting et al. | 382/276 |
| 2007/0019885 A1* | 1/2007 | Chatting et al. | 382/289 |
| 2007/0030520 A1* | 2/2007 | Sugimoto | 358/1.18 |
| 2007/0076020 A1* | 4/2007 | Fleming et al. | 345/698 |
| 2007/0171235 A1* | 7/2007 | Fujita et al. | 345/619 |
| 2007/0229917 A1* | 10/2007 | Itani | 358/479 |
| 2007/0247471 A1* | 10/2007 | Chatting et al. | 345/552 |
| 2007/0286484 A1* | 12/2007 | Xie et al. | 382/173 |
| 2008/0018660 A1* | 1/2008 | Nenonen et al. | 345/596 |
| 2008/0133603 A1* | 6/2008 | Fischer et al. | 707/104.1 |
| 2008/0166025 A1* | 7/2008 | Thorne | 382/118 |
| 2008/0170791 A1* | 7/2008 | Eskildsen et al. | 382/199 |

OTHER PUBLICATIONS

Jorge S. Marques Nicolás Pérez de la Blanca, Pedro Pina, "Pattern Recognition and Image Analysis" Second Iberian Conference, IbPRIA 2005 Estoril, Portugal, Jun. 7-9, 2005 Proceedings, Part I.*

Fred Stentiford ED—Sameer Singh et al., "Attention Based Facial Symmetry Detection", Pattern Recognition and Image Analysis Lecture Notes in Computer Science; ; LNCS, Springer-Verlag, BE, vol. 3687, 2005, pp. 112-119, XP019018520.

* cited by examiner

PROVIDING AN IMAGE FOR DISPLAY

This application is the U.S. national phase of International Application No. PCT/GB2007/003244 filed 28 Aug. 2007 which designated the U.S. and claims priority to European Application No. 06254504.1, filed 30 Aug. 2006 the entire contents of each of which are hereby incorporated by reference.

TECHNICAL FIELD

This invention relates to a method of providing an image for display, to apparatus providing an image for display, and to a computer readable medium loaded with machine readable instructions which when executed by computing apparatus control it to provide an image for display.

BACKGROUND TO THE INVENTION

Electronic displays, particularly those found on portable devices such as mobile telephones, personal digital assistants (PDAs) and the like, tend to have a resolution significantly lower than a resolution found with printed matter of the same size. The contrast of electronic displays moreover usually is inferior to the contrast of printed matter. These factors result in it being more difficult for users to obtain information from electronic displays, compared to printed material. There are ongoing efforts to improve displays. There are ongoing efforts also to provide information for display such that it can more easily be interpreted or reviewed by a user.

Non-textual content of most importance to users typically is faces of people in photographic images.

EP 1 589 478 discloses a digital camera operable to detect a face in a captured image, to place the face within a rectangle having corners defined by the face detection algorithm, and to magnify the image within the rectangle for display. This allows a user to see in close-up the faces of subjects in a captured scene.

Thumbnailing is a well-known technique for producing small, 'thumbnail' images such that a large number can be displayed together in a relatively small area. Usually, a thumbnail serves as a selectable link to a higher resolution version of the thumbnail image, or else the thumbnail acts as a selectable link to a collection of content items. Thumbnails can be displayed in a matrix or list so as to provide access to associated content or other information. This is particularly useful when the thumbnails include faces since users usually are able to recognise faces more quickly than they are able to read names.

Thumbnails are created by scaling the original image. Thumbnails can be created on the basis of only a part of the original image, although in this case user input is required.

The invention was made in this context.

SUMMARY OF THE INVENTION

According to a first aspect of the invention, there is provided a method of providing an image for display, the method comprising: (a) determining a target image size in terms of first and second dimensions; (b) processing an input image to detect a region of interest therein, the region having first and second dimensions; (c) determining a ratio of the aspect ratio of the region of interest to the aspect ratio of the target image size; and (d) selecting and applying one or more provided image processing rules in accordance with the ratio so determined in (c) thereby to map the region of interest onto the target image size.

This allows the generation of an image at a required size and shape with regard in particular to image from within the region of interest, instead of the input image as a whole. This is particularly useful when providing images at a high density, and when providing images on a small display.

The provided rules may include disproportionately scaling the region of interest in the event that the ratio so determined in (c) falls within a predetermined first range of values. Additionally, or alternatively, the provided rules may include providing the image with one or more borders comprising image data not forming part of the input image in the event that the ratio so determined in (c) falls within a predetermined second range of values. Additionally, or alternatively, the provided rules include providing the image with image data forming part of the input image external to the region of interest of the input image in the event that the ratio so determined in (c) falls within a predetermined third range of values. Additionally, or alternatively, the provided rules may include providing the image without image data from one side of the region of interest of the input image in the event that the ratio so determined in (c) falls within a predetermined fourth range of values.

Step (b) can comprise processing an input image to detect a region of interest which includes a face, the first and second dimensions corresponding substantially to facial width and height, respectively. The method may further comprise determining a line of symmetry within the region of interest and wherein said provided rule includes providing the image without image data from one side of the line of symmetry. The method may further comprise using the determined line of symmetry to refine detection of the face region of the input image prior to applying the selected rule or rules.

According to a second aspect of the invention, the there is provided a method of providing an image for display, the method comprising: determining a target image size in terms of first and second dimensions; processing an input image to detect a region of interest therein, the region having first and second dimensions; determining a ratio of an amount of scaling in one dimension to an amount of scaling in the other dimension that would be needed to map the region of interest of the input image onto the target image size; and in response to determining that the ratio meets a predetermined relationship with respect to a threshold, selecting one of a plurality of provided image processing rules thereby to map the region of interest onto the target image size.

There may also be provided machine readable instructions which when executed by computing apparatus cause it to perform the method steps outlined above.

According to a third aspect of the invention, there is provided a computer readable medium loaded with machine readable instructions which when executed by computing apparatus control it to provide an image for display, the instructions comprising: instructions for determining a target image size in terms of first and second dimensions; instructions for processing an input image to detect a region of interest therein, the region having first and second dimensions; instructions for determining a ratio of the aspect ratio of the region of interest to the aspect ratio of the target image size; and instructions for selecting and applying one or more provided image processing rules in accordance with the ratio so determined in thereby to map the region of interest onto the target image size.

According to a fourth aspect of the invention, there is provided apparatus for providing an image for display, the apparatus comprising a processor arranged: to determine a target image size in terms of first and second dimensions; to process an input image to detect a region of interest therein, the region having first and second dimensions; to determine a ratio of the aspect ratio of the region of interest to the aspect ratio of the target image size; and to select and apply one or more provided image processing rules in accordance with the ratio so determined thereby to map the region of interest onto the target image size.

According to a fifth aspect of the invention, there is provided apparatus for providing an image for display, the apparatus comprising a processor arranged: to determining a target image size in terms of first and second dimensions; to process an input image to detect a region of interest therein, the region having first and second dimensions; to determine a ratio of an amount of scaling in one dimension to an amount of scaling in the other dimension that would be needed to map the region of interest of the input image onto the target image size; and in response to determining that the ratio meets a predetermined relationship with respect to a threshold, to select one of a plurality of provided image processing rules thereby to map the region of interest onto the target image size.

According to a sixth aspect of the invention, there is provided apparatus for providing an image for display, the apparatus comprising a processor arranged: to determine a target image size in terms of first and second dimensions; to process an input image to detect a region of interest therein occupied by a face, the face region having first and second dimensions substantially representative of the face width and face height respectively; to determine a ratio of an amount of scaling in one dimension to an amount of scaling in the other dimension that would be needed to map the region of interest of the input image onto the target image size; and on the basis of the ratio so determined, to select and applying one of a plurality of provided image processing rules thereby to map the region of interest onto the target image size, wherein the available image processing rules include: proportionally scaling the region of interest to the target image size; disproportionately scaling the region of interest to the target image size; and providing the image without image data from one side of the region of interest of the input image According to a yet further aspect of the invention, there is provided a method of providing an image for display, the method comprising: determining a target image size in terms of first and second dimensions; processing an input image to detect a region of interest therein, the region of interest having first and second dimensions; and providing an image for display by modifying the input image having regard to the first and second dimensions of the target image size and the first and second dimensions of the region of interest in the input image. The method may comprise scaling the region of interest of the input image to the target image size. This provides prioritisation of the region of interest over other parts of the input image. By arranging for the region of interest to include a part of the input image most of interest to a user, this can have the positive effect of increasing the usefulness to the user of the resulting image. The method may comprise scaling the region of interest of the input image to the target image size in the first dimension to a different extent to scaling of the region of interest of the input image to the target image size in the second dimension. This can allow inclusion of all or a significant part of the region of interest in the resulting image even if the region of interest has a different aspect ratio to the target image. The method may comprise determining a ratio of an amount of scaling in one dimension to an amount of scaling in the other dimension that would be needed to map the region of interest of the input image onto the target image size. This allows a determination as to the relative proportions of the region of interest and the target image to be made. The method may comprise, in response to determining that the ratio meets a predetermined relationship with respect to a threshold, providing the image with one or more borders comprising image data not forming part of the input image. The method may alternatively or in addition comprise, in response to determining that the ratio meets a predetermined relationship with respect to a threshold, providing the image with image data external to the region of interest of the input image. These features allow inclusion of all or a significant part of the region of interest in the resulting image whilst limiting the amount of disproportionate scaling of the region of interest. Where the region of interest includes a face, these features can provide good recognisability of the subject of the input image. Processing the input image to detect a region of interest therein may comprise detecting a region of the input image occupied mostly by a face. Alternatively, processing an input image to detect a region of interest therein may comprise detecting a region of the input image occupied mostly by a face, and the method may additionally comprise, in response to determining that the ratio meets a predetermined relationship with respect to a threshold, providing the image without image data from one side of the region of interest of the input image. Since faces have a high degree of vertical symmetry, this can allow a good proportion of the resulting image to comprise image from the region of interest without excessive disproportionate scaling. The method may comprise determining a vertical line of symmetry within the region of interest. This line can be used as a limit to cropping of image from one side of the region of interest.

BRIEF DESCRIPTION OF THE DRAWINGS

Embodiments of the present invention will now be described, by way of example only, with reference to the accompanying drawings, in which.

DETAILED DESCRIPTION OF A PREFERRED EMBODIMENT

Figure 1:
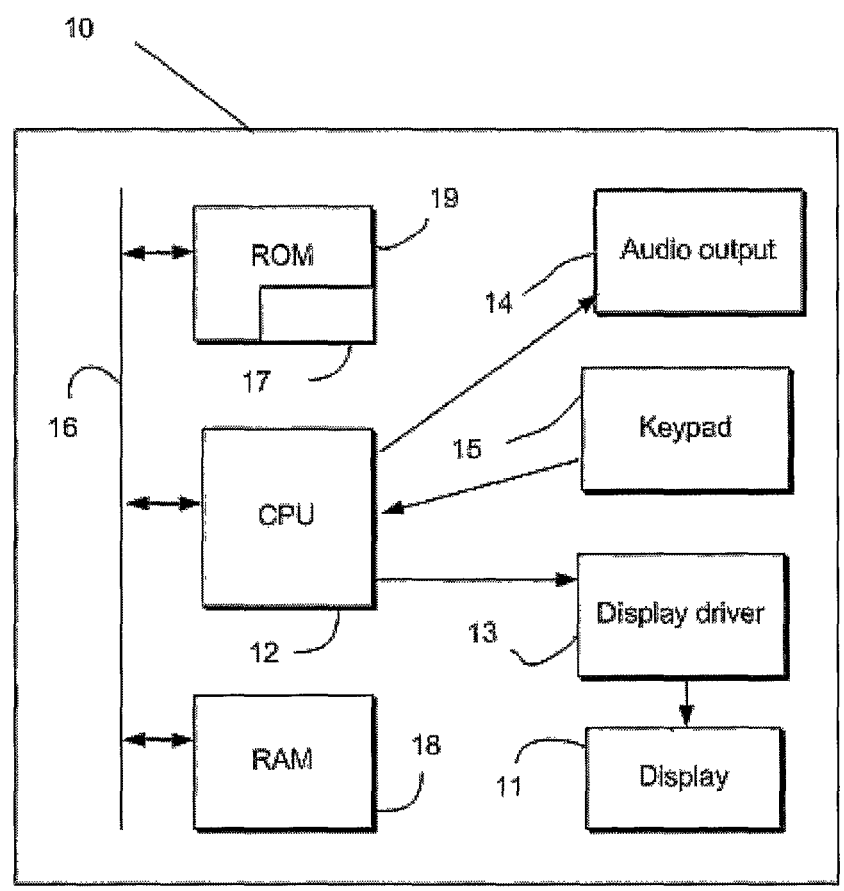
FIG. 1 is a schematic diagram illustrating components of a mobile device implementing the invention.

A computing device 10 is shown schematically in FIG. 1. In this example, the computing device is a mobile, portable communications device 10, for instance a mobile telephone, smartphone or personal digital assistant. The computing device 10 may instead be a notebook or laptop computer, gaming console or any other such device. The computing device 10 has a display 11 having a particular size and resolution. For instance, the display 11 may have a diagonal dimension of 6 cm and a resolution of 240 by 320 pixels. The resolution defines the number of pixels that the display includes. In the case of a 240 by 320 pixel display, there are 76,800 pixels.

The mobile device 10 includes a CPU 12, which provides video signals to the display 11, via a display driver 13, and to an audio output device 14 (e.g. headphone socket or speaker. The CPU 12 is connected to receive user inputs via a keypad 15. The CPU 12 is connected via a bus 16 to ROM 19 and to RAM 18. Stored in the ROM 19 are application or computer programs 17. These application or computer programs comprise machine readable instructions which are executed by the CPU 12 using the ROM 19 and/or the RAM 18 to achieve certain functionality, including the functionality described below. The mobile device 10 also includes other components which are not relevant to the invention so are not described here.

Figure 2:
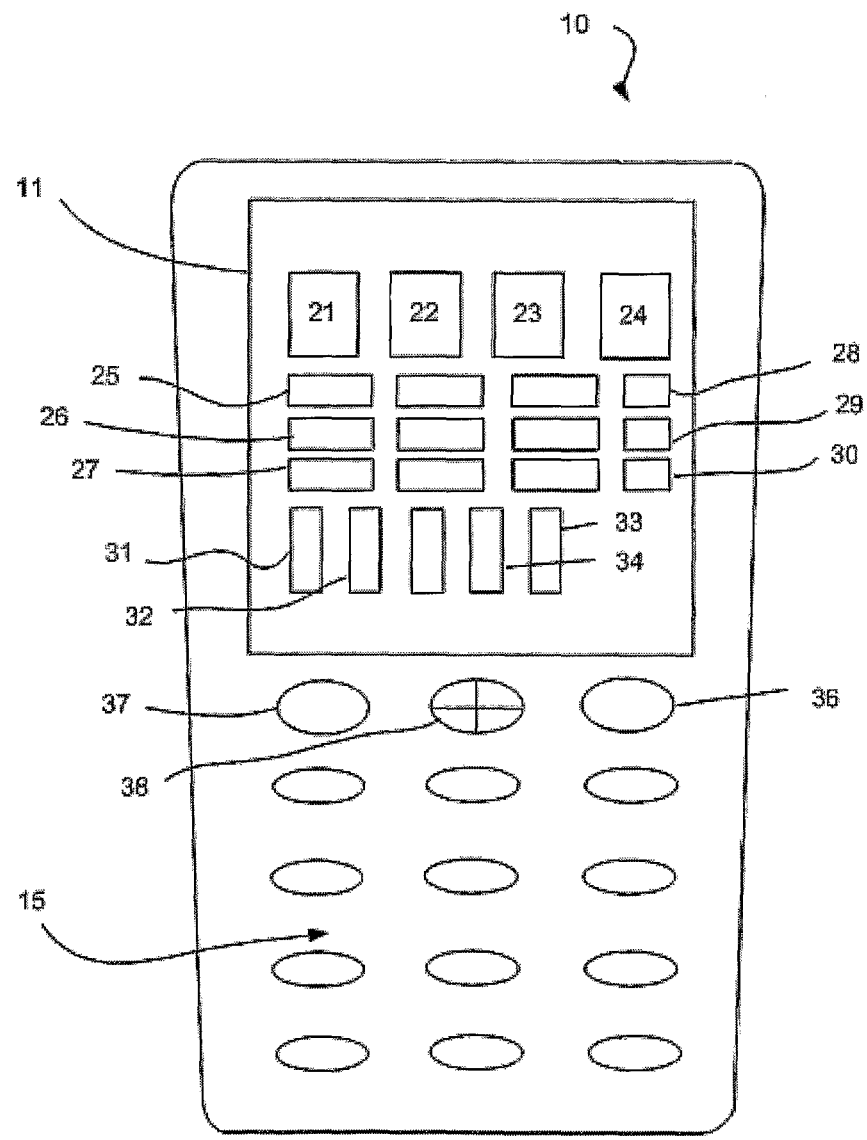
FIG. 2 is a schematic diagram illustrating the mobile device of FIG. 1 with thumbnails displayed thereon.

An exterior view of the mobile device 10 is shown in FIG. 2. Here, the display 11 is shown as being rectangular in shape, being 240 pixels wide and 320 pixels high. Within the area of the display 11, a number of thumbnails are displayed. The thumbnails are of different shapes and sizes, for purpose of illustration. An uppermost row includes thumbnails 21 to 24. These thumbnails 21-24 each have a size of 55 pixels high and 40 pixels wide. Below the thumbnails 21-24 are three columns of thumbnails. A first one of these columns includes thumbnails 25-27, each having a size of 55 pixels wide by 20 pixels high. The thumbnails of the next two columns also are 55 pixels wide by 20 pixels high. The fourth column includes thumbnails 28-30, which are 25 pixels wide by 20 pixels high. Below the columns of thumbnails is a further row of thumbnails, some of which are labelled at 31-24. these thumbnails are 20 pixels wide by 55 pixels high.

Thus, plural thumbnails are displayed within the bounds of the display 11. Since each thumbnail relates to a different item or leads to a further list of items, the provision of the thumbnails provides a user with access to many items on the mobile device. The thumbnails may relate for instance to phone book entries, in which case each thumbnail may include part of a photograph of the person corresponding to the entry. The thumbnails may instead relate to entries on a 'buddy list' or similar.

The thumbnails 21-24 can be said to be of default size. The provision of wide but short thumbnails 25-27 and tall but narrow thumbnails 31-34 allows more thumbnails to be displayed within the area of the display 11 than would be possible if just default size thumbnails were used. The thumbnails 28-30 are smaller still, so allow even greater thumbnail density. In many implementations, only one thumbnail size is used on a display at a given time. Where multiple thumbnail sizes are used, the size of the thumbnail could be a function of a perceived importance or priority of the corresponding item.

The mobile device 10 includes the keypad 15, first and second soft keys 36, 37 and a joystick or navigation key 38. A user is able to move between thumbnails using the joystick 38 or keys of the keypad 15, and select an operation to perform using the soft keys 36, 37 or the joystick 38.

Functionality provided by one of the application programs 17 includes image production. In particular, the application program 17 causes the CPU 12, using the ROM 19 and/or RAM 18 to determine dimensions of a target image size, to process an input image to detect a region of interest (having dimensions) therein, and provide an image for display by modifying the input image having regard to the dimensions of the target image size and having regard to the dimensions of the region of interest in the input image. This will now be described with reference to FIG. 3.

Figure 3:
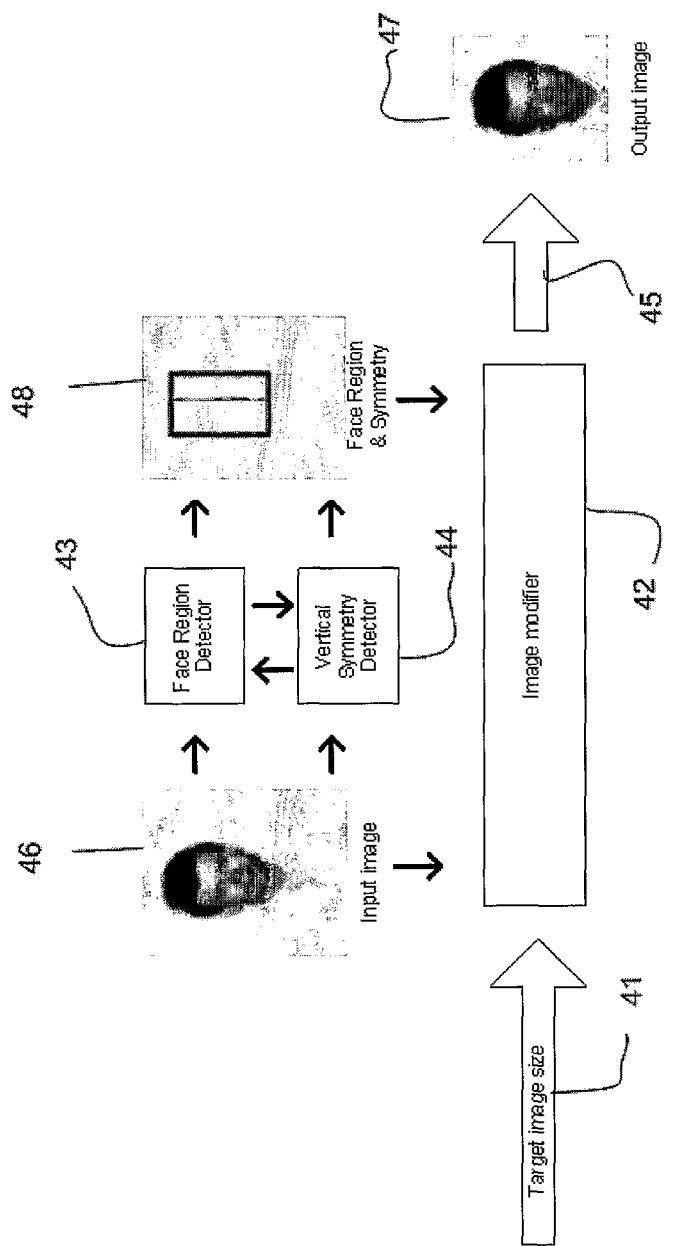
FIG. 3 is a schematic diagram illustrating operation of components of the mobile computing device of FIG. 1 in producing an image, in accordance with the invention.

In FIG. 3, a number of functional blocks together comprise an image providing function 40. The functional blocks include a target image size input block 41, an image modifier block 42, a face region detection and locator block 43, a vertical symmetry detection block 44 and an image output block 45. The function 40 operates on an input image 46 to provide an output image 47, and generates face region and symmetry information 48 when executed.

In response to a suitable stimulus, the exact nature of which is not relevant to this explanation, the function 40 is initiated.

When the function 40 is initiated, the target image size input block 41 determines a target image size. This may involve looking-up an image size from memory, or may involve receiving data defining an image size from one of the application programs 17. The face region locator block 43 then processes the input image 46 to determine the location of the face within the image. This can be carried out in any suitable way.

One technique for determining the location of a face within a picture is described in EP 1 589 478, mentioned above. Another technique is used in Suh, B., Ling, H., Bederson, B. B. & Jacobs, D. W. (2003) "Automatic Thumbnail Cropping and its Effectiveness", which is available at the time of writing at http://www.cs.umd.edu/Library/TRs/CS-TR-4469/CS-TR-4469.pdf. This paper refers to a number of face detection algorithms.

The face region locator block 43 provides as an output data which defines a border around a face in the input image 46. The border is rectangular, as can be seen in the Figure in the depiction of the face region and symmetry information 48. The border frames the face in any suitable way. For instance, the border may frame the face so as to include all of the central features, i.e. eyes, nose and mouth, but omit peripheral features such as the lower part of the chin and the upper part of the head (or hair), and may or may not include the ears. This provides containment within the border of the facial features which most readily allow recognition but without containment of other, less useful, information. The border provided by the face region locator block 43 could instead be larger, for instance large enough to border the whole of the head. Alternatively, the border provided by the face region locator block 43 could be smaller, for instance large enough to include the eyes nose, and mouth but not so large as to include the chin, forehead etc.

The data defining the border provided by the face region locator block 43 constitutes information identifying a region of interest, in this case a face, of the input image 46.

The vertical symmetry detection block 44 determines the vertical symmetry line of the face. This can be carried out in any suitable way. For instance, the vertical symmetry detection block 44 may utilise the algorithm described in Stentiford, F. W. M. (2005) "Attention Based Facial Symmetry Detection", International Conference on Advances in Pattern Recognition, Bath, UK. This reference is available at the time of writing at http://www.ee.ucl.ac.uk%7Efstentif/ICAPR_final.pdf.

The vertical symmetry detection block 44 provides as an output data defining a line of symmetry through the centre of the face. The line of symmetry passes through the nose. If in the input image 46 the subject is facing directly forwards, the line of symmetry dissects the face region at its centre. If in the input image 46 the subject is facing slightly to one side, the line of symmetry dissects the face region off-centre.

The line of symmetry is superimposed in the depiction of the face region and symmetry information 48 in the Figure on the border provided by the face region detection block 43.

Advantageously, the vertical symmetry detection block 44 and the face region locator block 43 co-operate to refine the detection of the face region and the vertical symmetry of the input image 46. Co-operation occurs through the face region locator block 43 using the data representing the line of symmetry, as provided by the vertical symmetry detection block 44, as an input to the process for the detection of the face region of the input image 46, and through the vertical symmetry detection block 44 using the data representing the border, as provided by the face region locator block 43, as an input to the process for the detection of the vertical line of symmetry of the input image 46. The process advantageously is iterative, thereby giving rise to improved results.

The input image 46, the face border data and the vertical symmetry data are provided as inputs to the image modifier block 42, along with the target image size. Operation of the image modifier block 42 will now be described with reference to FIGS. 3 and 4.

Figure 4:
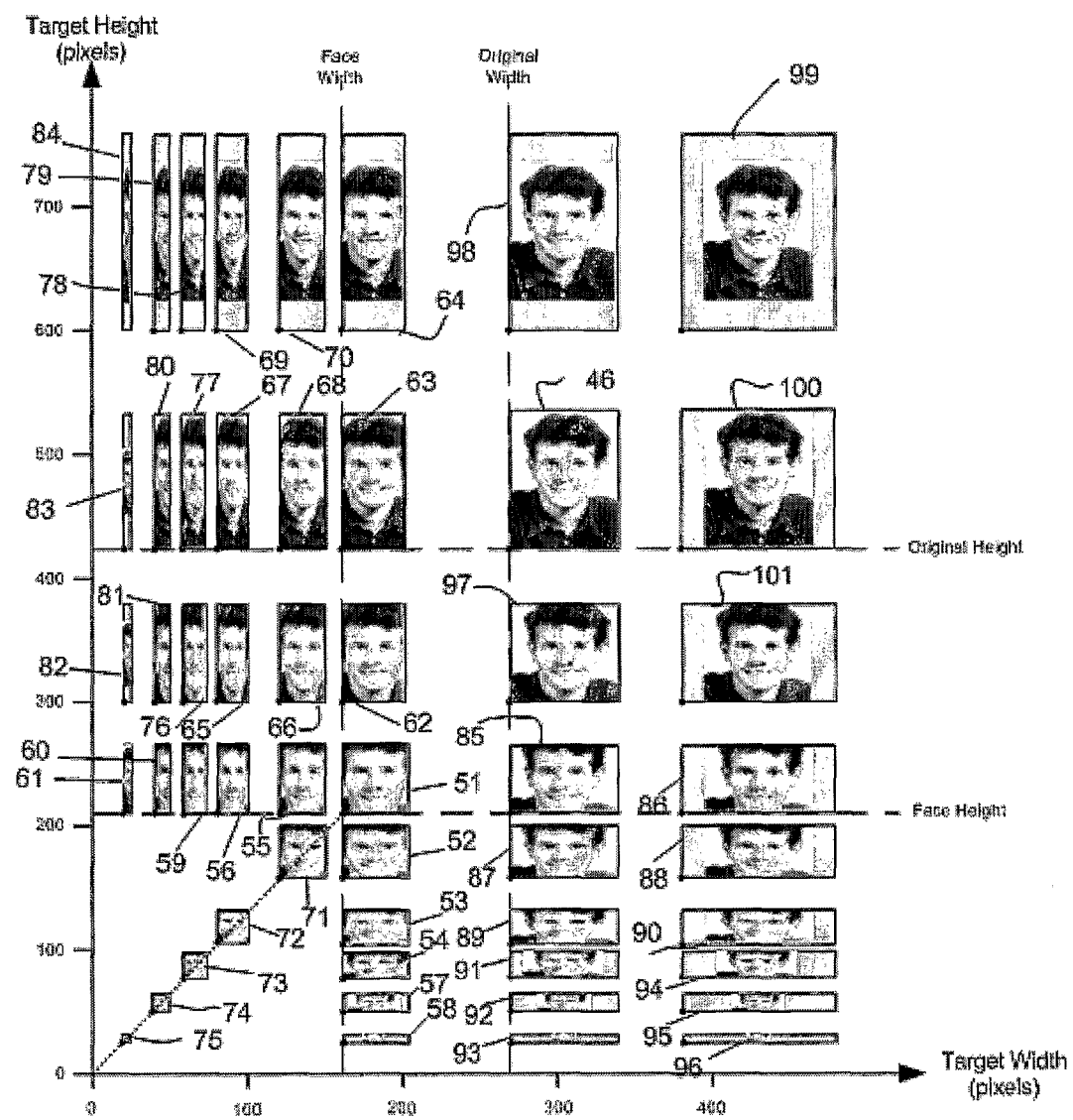
FIG. 4 is a diagram illustrating images produced by the components of FIG. 2.

In FIG. 4, a plot 51 of target image width on the abscissa versus target image height on the ordinate is shown. In the plot, a number of images are present. These images are shown at full size. Each image relates to a target image size equal to the abscissa and ordinate values at the bottom left corner of the image. The input image 46 is shown at 270 pixels (wide) by 420 pixels. The region of interest, as determined by the face region detector block 43, is shown at 165 by 210 pixels. The region of interest is labelled 51. Each image shown in the plot 50 indicates the image provided by the image modifier block 42. The image modifier block 42 provides the output image 47 by processing the input image 46 having regard to the height and width dimensions of the target image size and the height and width dimensions of the region of interest 51 of the input image 46.

The image modifier block 42 compares the height and width dimensions of the target image size to the height and width dimensions of the region of interest 51 of the input image 46. In the below, width and horizontal are used interchangeably, as are height and vertical.

There are five different possibilities for the result of the comparison.

Firstly, the target image size can be the same as the size of the region of interest of the input image 46. In this event, which is rare in practical implementations, the image modifier block 42 provides through the image output block 45 an output image 47 which is the same as the region of interest 51 of the input image 46.

The second possibility occurs when the height dimension of the target image size is less than the height dimension of the region of interest 51 of the input image 46 and/or the width dimension of the target image size is less than the width dimension of the region of interest 51 of the input image 46 and when the target image size is not larger than the region of interest in either dimension. In this case, a down-scaling operation is applied to the region of interest of the input signal 46, as follows.

The image modifier block 42 calculates the ratio of the aspect ratio of the target image size to the aspect ratio of the region of interest of the input image 46. The aspect ratio of an image is a number given by dividing the width of the image (in pixels or other unit) by the height. The ratio of aspect ratios is calculated using equation 1:

$$\text{Ratio of aspect ratios} = \frac{\text{face width/face height}}{\text{Target width/target height}}. \quad (1)$$

In cases where the aspect ratios of the target image size and the region of interest of the input image 46 are approximately the same, the image modifier block 42 applies scaling of the region of interest of the input image without any cropping. A determination as to whether the aspect ratios of the target image size and the region of interest of the input image 46 are approximately the same is made by determining where the ratio of aspect ratios lies with respect to two thresholds. If the ratio of aspect ratios is unity (one, 1), then the aspect ratios are the same. If the ratio of aspect ratios is less than unity, this indicates that the target image size is proportionally less tall than the region of interest. If the ratio of aspect ratios is greater than unity, this indicates that the target image size is proportionally taller than the region of interest.

If the ratio of aspect ratios is unity, proportionate downscaling is performed by the image modifier block 42. Here, the amount of scaling carried-out in the width dimension is the same as the amount of scaling carried-out in the height dimension. This scaling is demonstrated by the images 71 to 75 in FIG. 4.

If the ratio of aspect ratios is between 0.5 and unity, the image modifier block 42 applies disproportionate scaling to the region of interest. In particular, the image modifier block 42 scales the region of interest so that it fits exactly the target image size. Since the target image size is proportionally less tall than the region of interest, more scaling is applied in the vertical dimension than is applied in the horizontal dimension. Disproportionate scaling in this sense refers to there being different amounts of scaling in different dimensions. This scaling is demonstrated by the images 52 and 53 in FIG. 4. It will be appreciated that this provides an output image 47 which includes all of the region of interest, although scaled down to fit the target image size. Furthermore, the difference in the amount of scaling applied in the two dimensions does not exceed a predetermined ratio, in this case 2:1. This ensures that the distortion of the face in the output image 47 is not so great that it becomes difficult for a user to recognise the subject of the output image 47.

The image modifier block 42 applies disproportionate scaling to the region of interest also if the ratio of aspect ratios is greater than unity but less than 2 (two). In particular, the image modifier block 42 scales the region of interest so that it fits exactly the target image size. Since the target image size is proportionally taller than the region of interest, more scaling is applied in the horizontal dimension than is applied in the vertical dimension. This scaling is demonstrated by the images 55 and 56 in FIG. 4. This processing provides an output image 47 which includes all of the region of interest, although scaled down to fit the target image size. Furthermore, the difference in the amount of scaling applied in the two dimensions does not exceed a predetermined ratio, in this case 2:1. This ensures that the distortion of the face in the output image 47 is not so great that it is difficult for a user to recognise the subject of the output image 47.

If the ratio of aspect ratios is between zero and 0.5, the image modifier block 42 applies disproportionate scaling to the region of interest and includes part of the input image 46 from outside the region of interest, and possibly also a border. In particular, the image modifier block 42 scales the region of interest so that it fits exactly the target image size in the height dimension. In the width dimension, the entire width of the input image 46 is scaled by an amount equal to half the scaling applied in the height dimension. Where the resulting image is wider than the target image size, the additional width is cropped. This is demonstrated by image 54 in FIG. 4. Where the resulting image is narrower than the target image size, the additional width of the output image is filled with a border. This is demonstrated by images 57 and 58 in FIG. 4. It will be appreciated that this provides an output image 47 which includes all of the region of interest, although scaled down to fit the target image size. Furthermore, the difference in the amount of scaling applied in the two dimensions is not allowed to exceed a predetermined ratio. This ensures that the distortion of the face in the output image 47 is not so great that it is difficult for a user to recognise the subject of the output image 47.

If the ratio of aspect ratios is between two and infinity, the image modifier block 42 applies disproportionate scaling to the region of interest and omits image from one side of the region of interest. The image modifier block 42 may provide part of the input image 46 from above and below the region of interest, and may provide also a border. In particular, the image modifier block 42 scales the region of interest so that it fits exactly the target image size in the height dimension. In the width dimension, the entire width of the input image 46 is scaled by an amount equal to twice the scaling applied in the height dimension. Where the resulting image is wider than the target image size, the additional width is cropped from the right side of the image (the left side of the face) up to a maximum amount of cropping defined by the vertical symmetry data provided by the vertical symmetry detection block 44. This is demonstrated by images 59 and 60 in FIG. 4. Where the image cropped to the maximum permissible extent is wider than the target image size, additional height of the output image is provided with part of the input image 46 from above and below the region of interest, with any remaining space in the output image being filled with a border. This is demonstrated by image 61 in FIG. 4. It will be appreciated that this provides an output image 47 which includes at least the left side (as bounded by the vertical symmetry) of the region of interest, although scaled down to fit the target image size. Since faces have symmetry, the omission of all or part of one side of the face in the output image 47 does not significantly reduce the recognisability of the subject of the image. However, omission of the whole or part of one side of the face allows more of the area of the output image to be supplied with face image whilst not allowing the difference in the amount of scaling applied in the two dimensions to exceed a predetermined ratio. This ensures that the distortion of the face in the output image 47 is not so great that it is difficult for a user to recognise the subject of the output image 47.

The third possibility is that the target image size is larger than the region of interest in the height dimension and the same size or smaller in the width dimension. In this case, scaling is applied only in the width dimension. In the height dimension, the output image is provided with image from above and below the region of interest, and cropped as necessary to fit the target image size. Where the target image size is taller than the input image 46, additional height is filled with a border. Images where the target image size is larger than the region of interest in the height dimension and the same size in the width dimension are labelled at 62, 63 and 64 in FIG. 4. The image modifier 42 downscales the region of interest of the input image 46 in the width direction up to a maximum. This ensures that the difference in the amount of scaling applied in the two dimensions does not exceed a predetermined ratio. In this example, the maximum downscaling in the width direction is equal to one-half, so the difference in the amount of scaling applied in the two dimensions does not exceed 2:1. This ensures that the distortion of the face in the output image 47 is not so great that it is difficult for a user to recognise the subject of the output image 47. Images where the target image size is larger than the region of interest in the height dimension and narrower in the width dimension are labelled at 65 to 70 in FIG. 4. Where the image that would result from the maximum amount of downscaling in the width dimension is wider than the target image size, the additional width is cropped from the right side of the image (the left side of the face) up to a maximum amount of cropping defined by the vertical symmetry data provided by the vertical symmetry detection block 44. Additional height of the output image is provided with image from above and below the region of interest, with any remaining space in the output image being filled with a border. This is demonstrated by images 76 to 81 in FIG. 4. Where the image cropped to the maximum permissible extent is wider than the target image size, the image is downscaled in both dimensions so as to fit the target image in the width dimension but without exceeding a ratio of 2:1 in the difference in the amount of scaling applied in the two dimensions. This is demonstrated by images 82 to 84 in FIG. 4. It will be appreciated that this provides an output image 47 which includes at least the left side (as bounded by the vertical symmetry) of the region of interest, although scaled down to fit the target image size. Since faces have symmetry, the omission of all or part of one side of the face in the output image 47 does not significantly reduce the recognisability of the subject of the image. However, omission of the whole or part of one side of the face allows more of the area of the output image to be supplied with face image whist not allowing the difference in the amount of scaling applied in the two dimensions to exceed a predetermined ratio. This ensures that the distortion of the face in the output image 47 is not so great that it is difficult for a user to recognise the subject of the output image 47.

A fourth possibility is that the target image size is larger than the region of interest in the width dimension and the same size or smaller in the height dimension. In this case, scaling is applied only in the height dimension. In the width dimension, the output image is provided with image from left and right sides of the input image external to the region of interest, and cropped as necessary to fit the target image size. Where the target image size is wider than the input image 46, additional width is filled with a border. Images where the target image size is larger than the region of interest in the width dimension and the same size in the height dimension are labelled at 85 and 86 in FIG. 4. The image modifier 42 downscales the region of interest of the input image 46 in the height dimension up to a maximum. This ensures that the difference in the amount of scaling applied in the two dimensions does not exceed a predetermined ratio. In this example, the maximum downscaling in the height dimension is equal to twice the downscaling in the width dimension, so the difference in the amount of scaling applied in the two dimensions does not exceed 2:1. This ensures that the distortion of the face in the output image 47 is not so great that it is difficult for a user to recognise the subject of the output image 47.

Images where the target image size is larger than the region of interest in the width dimension and smaller in the height dimension are labelled at 87 to 90 in FIG. 4. If more than the maximum amount of downscaling in the height dimension is required, the image modifier 42 also downscales the image in the width dimension such as to retain the maximum 2:1 downscaling ratio. Where the resulting image is narrower than the target image size, the additional width of the output image is filled with a border. This is demonstrated by images 91 to 96 in FIG. 4. It will be appreciated that this provides an output image 47 which includes all of the region of interest, although scaled down to fit the target image size. Since the difference in the amount of scaling applied in the two dimensions is not allowed to exceed a predetermined ratio, the distortion of the face in the output image 47 is not so great that it is difficult for a user to recognise the subject of the output image 47.

The fifth possibility is that the target image size is larger than the region of interest in the width dimension and in the height dimension. In this case, the region of interest is provided in the output image 47 at the same size it is in the input image 46. This is demonstrated by image 97 in FIG. 4. Additional width and height is provided by image forming part of the input image external to the region of interest, cropped as necessary, and also by borders if required. This is demonstrated by images 97 to 101 in FIG. 4.

Although the maximum differences in scaling between the width and height dimensions are stated to remain less than or equal to a ratio of 2:1, the maximum permitted difference may be less than this. In particular, the inventors have found that the recognisability of a subject from a disproportionately scaled image reduces as the ratio exceeds 4:3. Thus, other embodiments utilise a disproportionate scaling threshold ratio of 4:3 or similar.

The images provided by the above operation can be of any required size and shape yet provide maximum recognisability of the subject of the input image. This is particularly useful when providing images at a high density, and when providing images on a small display.

In all the above, where an image including parts outside the region of interest is cropped, the resulting image wherever possible has an equal amount of image either side of the region of interest.

Since in the above no part of any image is up-scaled, the output image 47 cannot have a resolution greater than the resolution of the input image 46. This ensures that there is no loss of picture quality, except when the output image 47 is smaller than the region of interest of the input image 46.

Instead of performing vertical face symmetry detection, it can be assumed that the subject of an input image is facing directly forward and on this basis take the central point of the detected face region as the centre of the face. This alternative is advantageous since it does not require any face symmetry detection to be performed, and thus requires less processing resources.

The output image 47 provided by the above rules is stored at a suitable location in the ROM 19 and/or the RAM 18, from where it can be retrieved for display on the display 11 as required. It is expected that the above operation is best performed in advance of the image having the target image size being required. This is especially so with mobile devices, where processing resources are limited and processor use undesirably consumes battery power. Where sufficient resources are present, e.g. in a desktop environment, the above operation may instead be performed as required, instead of in advance.

Advantageously, the above operation can be performed in respect of an input image to provide output images at different sizes. This allows an image to be displayed at different sizes, for use for instance with different applications or in different views within a single application, but without requiring differently-sized images to be generated as they are required. The face border data and the vertical symmetry data does not need to be calculated for each different output image size. Instead, the face border data and the vertical symmetry data are stored when generated in the process of providing the first output image from the input image, and are re-used for subsequent image provision operations.

The above described embodiment involves detecting a region of interest which includes a face. It will be appreciated that the concept applies equally to non-facial regions. Although detection of substantially vertical symmetry was described in relation to facial regions, it will be appreciated that non-vertical lines of symmetry could be identified and used, where appropriate, to crop the input image to show just one side.

The invention claimed is:

1. A method of providing an image for display, the method comprising:
   (a) determining a target image size in terms of first and second dimensions;
   (b) processing, using a computer processor, an input image to detect a region of interest therein, the region having first and second dimensions, wherein the processing comprises processing an input image to detect a region of interest which includes a face, the first and second dimensions corresponding substantially to facial width and height, respectively;
   (c) determining a ratio of the aspect ratio of the region of interest to the aspect ratio of the target image size; and
   (d) determining a line of symmetry within the region of interest and selecting and applying one or more provided image processing rules in accordance with the ratio so determined in (c) thereby to map the region of interest onto the target image size,
   wherein said provided rule includes providing the image without image data from one side of the line of symmetry, and wherein each of the provided rules includes scaling the region of interest.

2. The method according to claim 1, wherein the provided rules include disproportionately scaling the region of interest in the event that the ratio so determined in (c) falls within a predetermined first range of values.

3. The method according to claim 1, wherein the provided rules include providing the image with one or more borders comprising image data not forming part of the input image in the event that the ratio so determined in (c) falls within a predetermined range of values.

4. The method according to claim 1, wherein the provided rules include providing the image with image data forming part of the input image external to the region of interest of the input image in the event that the ratio so determined in (c) fails within a predetermined range of values.

5. The method according to claim 1, wherein the provided rules include providing the image without image data from one side of the region of interest of the input image in the event that the ratio so determined in (c) falls within a predetermined range of values.

6. The method according to claim 1, further comprising using the determined line of symmetry to refine detection of the face region of the input image prior to applying the selected rule or rules.

7. A method of providing an image for display, the method comprising:
   determining a target image size in terms of first and second dimensions;
   processing, using a computer processor, an input image to detect a region of interest therein, the region having first and second dimensions, wherein the input image is processed to detect a region of interest which includes a face, the first and second dimensions corresponding substantially to facial width and height, respectively;
   determining a ratio of an amount of scaling in one dimension to an amount of scaling in the other dimension that would be needed to map the region of interest of the input image onto the target image size;
   in response to determining that the ratio meets a predetermined relationship with respect to a threshold:
   (i) determining a line of symmetry within the region of interest, and
   (ii) selecting one of a plurality of provided image processing rules thereby to map the region of interest onto the target image size,
   wherein said provided rule includes providing the image without image data from one side of the line of symmetry, and wherein each of the provided rules includes scaling the region of interest.

8. A machine having a non-transitory computer readable storage medium storing readable instructions which when executed by computing apparatus cause it to perform the method of claim 1.

9. A non-transitory computer readable medium loaded with machine readable instructions, which when executed by a computing apparatus, control it to provide an image for display, the instructions comprising:
   determining a target image size in terms of first and second dimensions;
   processing an input image to detect a region of interest therein, the region having first and second dimensions, wherein the input image is processed to detect a region of interest which includes a face, the first and second dimensions corresponding substantially to facial width and height, respectively;
   determining a ratio of the aspect ratio of the region of interest to the aspect ratio of the target image size;
   determining a line of symmetry within the region of interest; and
   selecting and applying one or more provided image processing rules in accordance with the ratio so determined in thereby to map the region of interest onto the target image size,
   wherein said one or more provided rules include providing the image without image data from one side of the line of symmetry, and wherein each of the provided rules includes scaling the region of interest.

10. Apparatus for providing an image for display, the apparatus comprising a processor arranged:
   to determine a target image size in terms of first and second dimensions;
   to process an input image to detect a region of interest therein, the region having first and second dimensions, wherein the processor is adapted to process the input image to detect a region of interest which includes a face, the first and second dimensions corresponding substantially to facial width and height, respectively;
   to determine a ratio of the aspect ratio of the region of interest to the aspect ratio of the target image size;
   to determine a line of symmetry within the region of interest; and
   to select and apply one or more provided image processing rules in accordance with the ratio so determined thereby to map the region of interest onto the target image size,
   wherein said one or more provided rules include providing the image without image data from one side of the line of symmetry, and wherein each of the provided rules includes scaling the region of interest.

11. Apparatus for providing an image for display, the apparatus comprising a processor arranged:
   to determining a target image size in terms of first and second dimensions;
   to process an input image to detect a region of interest therein, the region having first and second dimensions, wherein the processor is arranged to process the input image to detect a region of interest which includes a face, the first and second dimensions corresponding substantially to facial width and height, respectively;
   to determine a ratio of an amount of scaling in one dimension to an amount of scaling in the other dimension that would be needed to map the region of interest of the input image onto the target image size;
   to determine a line of symmetry within the region of interest; and
   in response to determining that the ratio meets a predetermined relationship with respect to a threshold, to select one of a plurality of provided image processing rules thereby to map the region of interest onto the target image size,
   wherein said provided rule includes providing the image without image data from one side of the line of symmetry, and wherein each of the provided rules includes scaling the region of interest.

12. Apparatus for providing an image for display, the apparatus comprising a processor arranged:
   to determine a target image size in terms of first and second dimensions;
   to process an input image to detect a region of interest therein occupied by a face, the face region having first and second dimensions substantially representative of the face width and face height respectively;
   to determine a ratio of an amount of scaling in one dimension to an amount of scaling in the other dimension that would be needed to map the region of interest of the input image onto the target image size;
   to determine a line of symmetry within the region of interest; and
   on the basis of the ratio so determined, to select and applying one of a plurality of provided image processing rules thereby to map the region of interest onto the target image size,
   wherein the available image processing rules include:
   (i) proportionally scaling the region of interest to the target image size;
   (ii) disproportionately scaling the region of interest to the target image size; and
   (iii) providing the image without image data from one side of the region of interest of the input image,
   wherein said one or more provided rules include providing the image without image data from one side of the line of symmetry, and wherein each of the provided rules includes scaling the region of interest.

* * * * *